(12) United States Patent
Buchheit et al.

(10) Patent No.: US 7,499,996 B1
(45) Date of Patent: Mar. 3, 2009

(54) SYSTEMS AND METHODS FOR DETECTING A MEMORY CONDITION AND PROVIDING AN ALERT

(75) Inventors: Paul T. Buchheit, Mountain View, CA (US); Nahush Mahajan, Sunnyvale, CA (US); Keith J. Coleman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 631 days.

(21) Appl. No.: 11/292,906

(22) Filed: Dec. 1, 2005

Related U.S. Application Data

(60) Provisional application No. 60/638,540, filed on Dec. 22, 2004.

(51) Int. Cl.
*G06F 15/173* (2006.01)
(52) U.S. Cl. .................. 709/224; 709/203; 709/212; 709/217
(58) Field of Classification Search .......... 709/203, 709/212, 217, 223, 224
See application file for complete search history.

(56) References Cited

U.S. PATENT DOCUMENTS

| | | | |
|---|---|---|---|
| 5,208,748 A | 5/1993 | Flores et al. ............... 704/1 |
| 5,216,603 A | 6/1993 | Flores et al. ............... 704/1 |
| 5,613,108 A | 3/1997 | Morikawa ............... 393/616 |
| 5,621,892 A * | 4/1997 | Cook ............... 709/224 |
| 5,734,837 A | 3/1998 | Flores et al. ............... 705/7 |
| 5,948,058 A | 9/1999 | Kudoh et al. ............... 709/206 |
| 6,185,551 B1 | 2/2001 | Birrell et al. ............... 707/3 |
| 6,438,593 B1 * | 8/2002 | Khanna et al. ............... 709/224 |
| 6,983,318 B2 * | 1/2006 | Doyle ............... 709/223 |
| 7,036,040 B2 * | 4/2006 | Nicholson et al. ............... 714/6 |
| 7,089,296 B2 * | 8/2006 | Dai et al. ............... 709/219 |
| 7,103,794 B2 * | 9/2006 | Malcolm et al. ............... 714/4 |
| 2001/0049727 A1 * | 12/2001 | Mukherjee et al. ............... 709/219 |
| 2002/0099807 A1 * | 7/2002 | Doyle ............... 709/223 |

(Continued)

FOREIGN PATENT DOCUMENTS

WO      WO 00/23931      4/2000

OTHER PUBLICATIONS

Comer, D. and Peterson, L., "Conversation-Based Mail," ACM Transactions on Computer Systems (TOCS) vol. 4, Issue 4, pp. 299-319, Nov. 1986.

(Continued)

*Primary Examiner*—Michael Won
(74) *Attorney, Agent, or Firm*—Morgan, Lewis & Bockius LLP

(57) ABSTRACT

The invention detects a full browser cache using multiple requests for the same page from a known URL. A request to the URL returns a page with a randomly or pseudo-randomly generated number. A request and then a re-request is made for the same page. If the cache is operating normally, the page for the re-request will be obtained from the browser cache and the number in the first request response will match the number from the re-request response. If the cache is not properly storing pages, the page will be fetched from the URL and contain a different randomly generated number, and therefore, the number in the two responses will not match. The user is notified and may be pointed to information explaining how to empty the cache.

24 Claims, 6 Drawing Sheets

U.S. PATENT DOCUMENTS

| | | | |
|---|---|---|---|
| 2002/0099818 A1* | 7/2002 | Russell et al. | 709/224 |
| 2002/0178232 A1* | 11/2002 | Ferguson | 709/217 |
| 2003/0028631 A1* | 2/2003 | Rhodes | 709/224 |
| 2003/0233419 A1 | 12/2003 | Beringer | 709/206 |
| 2005/0172080 A1* | 8/2005 | Miyauchi | 711/136 |

OTHER PUBLICATIONS

Bellotti, V et al., (2003), "Taking Email to Task: the design and evaluation of a task management centered email tool." In Conference Proceedings on Human Factors in Computing Systems (CHI2003), pp. 345-352, Apr. 5-10, 2003, Fort Lauderdale, Florida.

Bellotti, V. et al., "Taskmaster: recasting email as task management," PARC, CSCW '02 Workshop on Redesigning Email for the 21st Century.

Flores, F. et al., "Computer Systems and the design of organizational interaction," ACM Transactions on Information Systems., pp. 153-172, (1988).

Shepherd, A. et al., "Strudel-an extensible electronic conversation toolkit," Proceedings of the 1990 ACM Conference on Computer-supported Cooperative Work, Los Angeles, California, United States, pp. 93-104.

Venolia, G., et al., "Supporting Email Workflow," Technical Report MSR-TR-2001-88, Microsoft Corporation, 10 pages (Sep. 2001).

Winograd, T., (1987), "A language/action perspective on the design of cooperative work," Human-Computer Interaction, vol. 3 No. 1, pp. 3-30, (1987-1988). Earlier version presented at the Conference on Computer-supported Cooperative Work, Austin, pp. 203-220, Dec. 1986.

Winograd, T., "Where the Action is," pp. 256A-260, Byte, Dec. 1988.

Zawinski, J., "Message Threading," http://www.jwz.org/doc/threading.html, pp. 1-9 (1997-2000).

* cited by examiner

SYSTEMS AND METHODS FOR DETECTING A MEMORY CONDITION AND PROVIDING AN ALERT

RELATED APPLICATIONS

This application claims priority to U.S. Provisional Patent Application No. 60/638,540, filed on Dec. 22, 2004, and which is incorporated by referenced herein in its entirety. This application is also related to U.S. patent application Ser. No. 10/914,035, filed Aug. 6, 2004, entitled "Displaying Conversations in a Conversation-Based E-mail System," which application is incorporated by reference herein in its entirety.

TECHNICAL FIELD

The present invention relates generally to browser-based applications for use in computer network systems, and in particular to detecting certain cache conditions.

BACKGROUND

A browser's cache is a memory storage location in a local memory for storing recently accessed information from the Internet. When a page is downloaded by the browser, in many instances the page is cached in the local memory (subject to certain caching rules). When the browser subsequently requests the page, that page can be obtained from the cache instead of being downloaded from the original location (subject to certain expiration and validation options and/or requirements). Use of a cache in this manner has the advantage of reducing network traffic and speeding up the user's experience. When a user terminates a browsing session, the pages in the cache are usually maintained. Unfortunately, a browser's cache will occasionally fill up despite some cache removal procedures and cause web-based applications to slow down or fail. It would be desirable to detect when a cache is not properly operating and alert a user.

SUMMARY

According to some embodiments of the invention, a document is requested from a location. A first response is received from the location and includes a first value. The document is then re-requested from the same location. A second response is received which includes a second value. A memory condition is detected then the first value and the second value differ.

BRIEF DESCRIPTION OF THE DRAWINGS

The aforementioned features and advantages of the invention as well as additional features and advantages thereof will be more clearly understood hereinafter as a result of the following detailed description of embodiments of the invention when taken in conjunction with the drawings. Like reference numerals refer to corresponding parts throughout the several views of the drawings.

DESCRIPTION OF EMBODIMENTS

According to some embodiments, a browser cache condition may be detected by using multiple requests for the same document from a location (e.g., a Uniform Resource Locator (URL)). A request to the location returns a page with a random or pseudo-randomly generated number. A re-request is made for the same document from the same location. If the cache is operating normally, the page for the re-request will most likely be obtained from the browser cache and the number from the first request response will match the number from the re-request. If the cache is not caching pages correctly (e.g., because the cache is full), the page will be fetched anew from the location and contain a different randomly generated number. In some embodiments, the user is notified and/or may be pointed to information explaining how to resolve the cache condition. In some embodiments, a determination of proxy caching can be made by making a request to a URL including user information. If a response is returned including information associated with a different user, then it is highly likely that a previously cached response was returned. In some embodiments, the responses include instructions not to cache the response. Therefore, an intermediate proxy had stored the previous page contrary to the settings.

Figure 1:
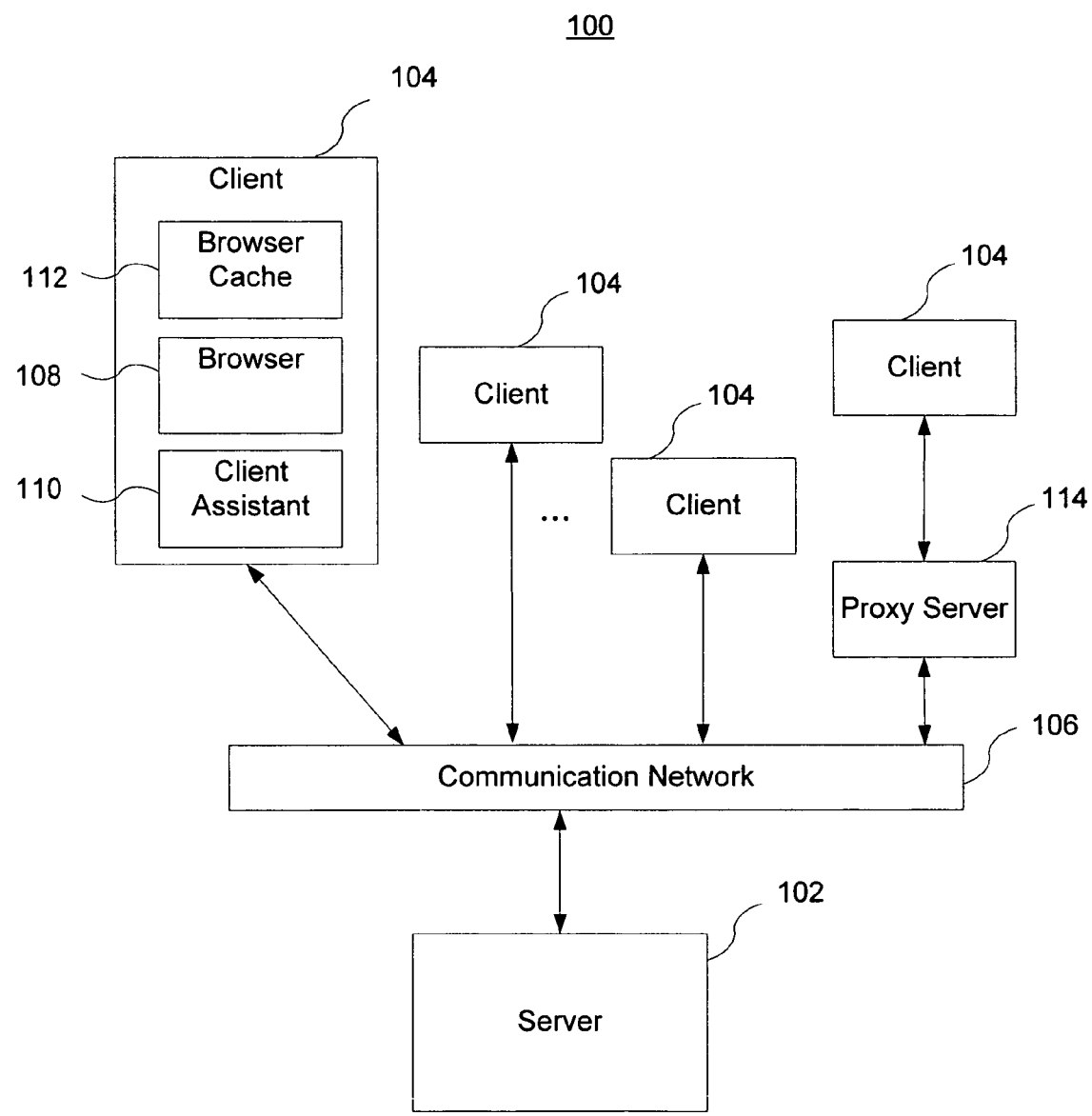
FIG. 1 depicts an environment in accordance with some embodiments of the present invention.

FIG. 1 schematically illustrates one embodiment of a client-server environment 100 suitable for implementing some embodiments of the invention. The environment 100 includes a server 102, a communication network 106 and a plurality of clients 104. In some embodiments, the client 104 includes a browser 108, a client assistant 110 and a browser cache 112. In some embodiments, a proxy server 114 may be connected between the client 104 and the server 102.

The client 104 can be any number of devices used to enable the browser 108 to make requests to the server 102 (e.g., computer, internet kiosk, personal digital assistant, cell phone, gaming device, desktop computer, laptop computer). The browser 108 can be a general purpose Internet browser (sometimes called a Web browser) having a browser window used for displaying information (e.g., FireFox, Safari, Mozilla, Opera, Internet Explorer) or a special purpose interface for use with an application residing in whole or in part on the server 102. The information may be rendered by the browser 108 using the hypertext markup language (HTML) or any other appropriate rendering methodology. Requests sent through the browser 108 to the server 102 are acted upon by the server which typically responds by accessing the desired information and creating a responsive document which it sends, as well as a set of display instructions, back to the client 104. The browser 108 may store downloaded pages in browser cache 112 for possible subsequent access without requiring the document to be again obtained from the document source.

In some embodiments, the client assistant 110 is a locally resident program in the client 104 that assists in determining a cache condition. In some embodiments, the cache condition is a cache full condition. In some embodiments, the client assistant 110 is a JavaScript or ECMAScript program (or set of instructions) embedded in one or more web pages or other documents downloaded from a server (e.g., server 102) or other location. The JavaScript or ECMAScript program or instructions in the client assistant 110 may be executed by the client 104 in an environment (e.g., a virtual machine environment or program interpreter) provided by the browser 108.

In some embodiments, the client assistant 110 is a plug-in to the browser 108. In some embodiments, all or a portion of the client assistant 110 is part of a toolbar application for the browser 108. In some embodiments, the client assistant is a stand-alone program. It is sufficient that the client assistant 110 be able to generate requests to and receive the responses from the browser 108. In some embodiments, the client assistant 110 is executable code that is included in a page sent by a web-based application service. In some embodiments, the page is downloaded from a web-based communication program (e.g., the Google Gmail email application).

Figure 2:
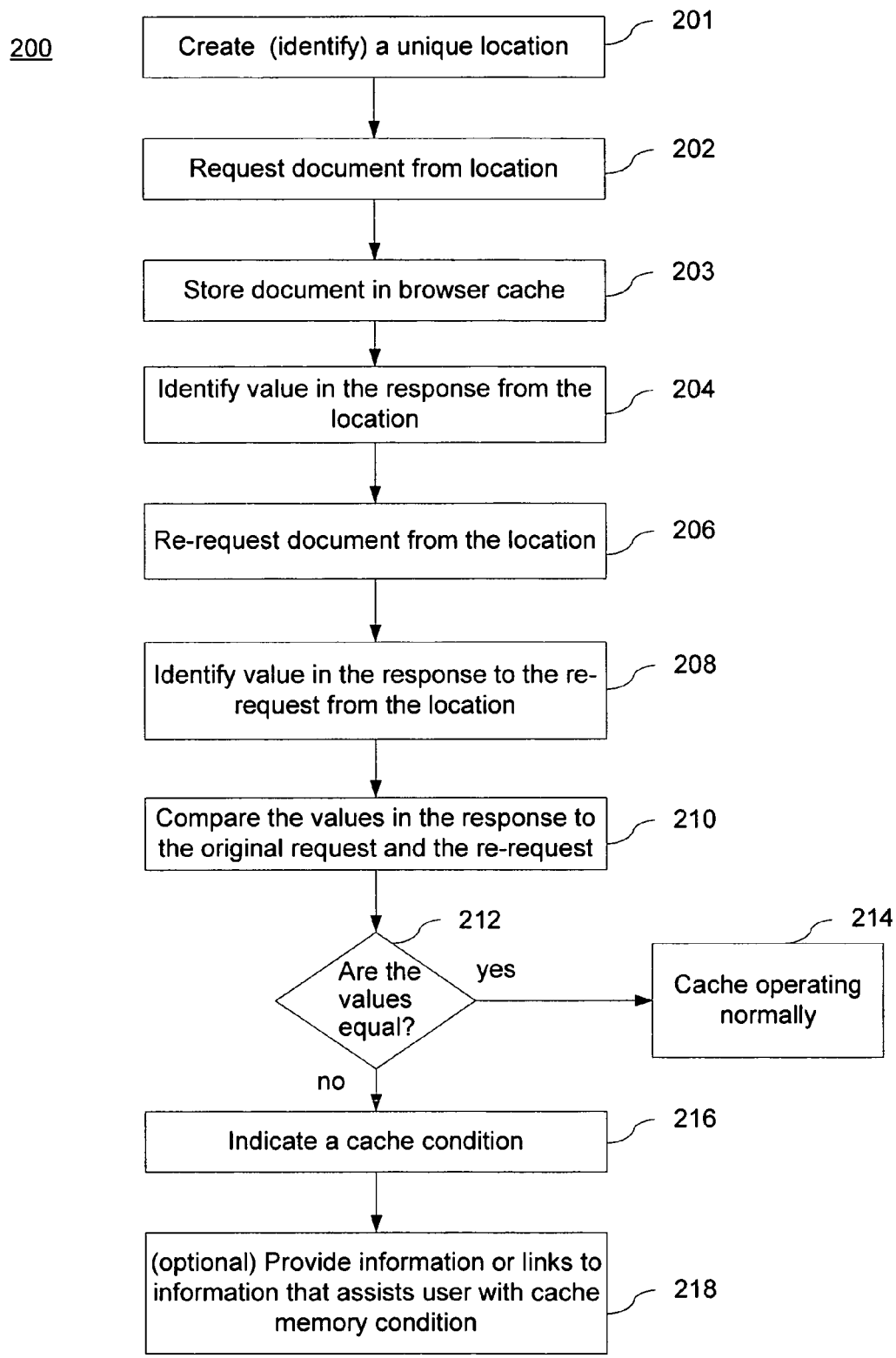
FIG. 2 depicts a process for detecting a cache condition in accordance with some embodiments of the present invention.

FIG. 2 depicts an exemplary process 200 which detects a cache condition according to some embodiments of the invention. Initially, a network address (i.e., a network location value) is created (201). In some embodiments, the network address is a URL generated uniquely for the request (and also used for the re-request described below). In some embodiments the network address is generated by making a procedure call to a random or pseudorandom number or string generation function. For instance, the java function getRandomString(n) may be used to generate a "random" (i.e., pseudorandom) alphanumeric string of length n, where "n" is an integer value provided to the function. The resulting random value is included as a parameter value in the URL generated at 201. As a result, the URL generated at 201 will be different than the URL for any document cached in the browser cache of the client, and therefore any request sent to the server using this URL will not result in a cache hit in the browser cache.

In some embodiments, the network address generated at 201 is a URL at a server (e.g., server 102) which responds to the request directed to the URL as described below. In some embodiments, the generated network address is a location in the network identified by the URL, and in some embodiments, the location is local to the client 104. It is sufficient that a request to the location result in a response as described below (e.g., including a randomly generated number). While the location could be any location designed to respond with an appropriate response, for the purposes of simplifying the following discussion, it is assumed that the location is on server 102. A request is made for a document at the generated network location (202). In some embodiments, the request is an HTTP "GET" request. In some embodiments, the request is an XML "GET" request. For the reasons explained above, the request made at 202 will not result in a cache hit in the browser cache, and therefore the request will be sent by the browser 108 to the server 102. When the response is returned from server 102, a value in the response is identified (204). In addition, the browser 108, if the browser cache is operating normally, stores a copy of the returned document (sometimes herein called the response) in the browse cache 112 N (203). As described in more detail below, according to some embodiments, in response to each request, the server 102 returns a document with a random or pseudo-randomly generated number. A re-request is then made for the document from the same network location (206).

If the browser cache 112 is operating normally, the browser cache 112 is examined for the document in response to the re-request at 206. If the document is in the browser cache 112, then the browser 108 makes a determination of whether to use all or a portion of the cached version of the document, and/or to obtain all or a portion of the document from the server 102 (e.g., the user may have set browser options to check for newer versions of pages stored in the cache). In some embodiments, one or more fields (sometimes called header fields) in the response sent by server 102 in response to the request generated at 202 (and, optionally, in the response to the re-request at 206, described below) are set to increase the likelihood that if the response to the request generated at 202 is stored in the browser cache 112, the browser 108 will use the response from the browser cache 112. For example, the response sent by the server may include a Last-Modified field with a date and time value, such as the current date and time. Alternately, the Last-Modified field may have a value equal to a predefined or fixed date and time (e.g., "Thu, 1 Apr. 2004 04:50:27 GMT") that is used by the server when responding to all requests for a random number. Another field that may be included in the response sent by the server is a Cache-Control field with a value of "private, proxy-revalidate." A setting of "private" implies that the response should not be cached in a cache accessible by more than one user and a setting of "proxy-revalidate" implies that the cached response need not be-revalidated unless the response is being cached in a proxy cache.

In some situations, the browser 108 may determine that a cached document has expired (see Request for Comments (RFC) 2616 from the Internet Engineering Task Force (IETF) June 1999, which is incorporated by reference herein in its entirety) and obtains the document anew from the location. In some embodiments, the response sent by server 102 to requests generated at 202 includes expiration information indicating that the response never expires, or at least does not expire by an expected time of the re-request.

In some embodiments, the browser 108 sends the re-request to the server 102 at the URL including the "Last-Modified" field value of the previously cached response as the value for the "If-Modified-Since" field of the re-request. The "If-Modified-Since" field value is used by the server to make a determination about whether the document stored on the server has been modified since the last time that the document was received by the browser 108. If the server 102 determines that the document has changed since the last download, it will respond to the request with a new version of the document. In some embodiments, the server 102 determines that the document has not been changed since the last download to the browser 108, and sends a response indicating that the cached version is suitable for use (e.g., a status code of 304 (Not Modified)). In some embodiments, when responding to a request directed to a URL that includes an "If-Modified-Since" field, the server 102 never determines that the document has been modified at the server since the last time the browser downloaded it. If the browser 108 cannot access the browser cache 112 or was unable to cache the previous response, the re-request will not contain a "If-Modified-Since" field.

The response from the server 102 to the re-request is examined and the value identified (208). The values from the first request and the re-request are compared (210). If the values are the same (212-yes), then the browser 108 used the version of the document saved in the browser cache 112. Due to the randomness of the values embedded in the responses provided by the server 102 to the requests generated by browser 108, it is nearly impossible for the server to provide a response to two requests with the same value. Therefore, the value must have come from the cached version of the document. Accordingly, the cache is deemed to be operating normally (214).

On the other hand, if the two values are different (212-no), then the browser 108 obtained the document anew from the server 108 and did not use the cached version (i.e., the server 102 responded to the re-request by providing a version of the document which included a newly generated random number). A cache condition is then indicated to the user (216). In some embodiments, the cache condition indicates that pages are not being properly cached. In some embodiments, the cache condition indicates that the cache is full. In some embodiments, the indication is in the form of a visually distinctive indicator in the browsing window. In some embodiments, the indication is provided in a pop-up window. One of ordinary skill in the art will readily recognize other ways to provide an indication to the user without departing from the scope of the invention. Optionally, the user may be provided with instructions to clear the cache or links to assisting the user in clearing the cache and/or additional information about the condition. In some embodiments, the user is provided the ability to clear and/or hide the indication.

The process 200 may be executed at various times. In some embodiments, the process 200 is executed during an initial log-in phase of a web-based application. In some embodiments, the process 200 is executed when a determination is made that use of the cache is likely due to current state information of the web-based application. For example, in some embodiments, a web-based communication program determines that cache use is likely when an email that is about to be displayed (or an email that is currently being displayed) includes attachments. The user is likely to download the attachments (which would be downloaded using the cache). In some embodiments, the process 200 is executed periodically during an application session while the web-based application is running. In some embodiments, the process 200 is executed again after the user has cleared and/or hid the indication. In some instances the user may clear and/or hide the indication yet not take appropriate action to prevent the cache condition from continuing to occur (e.g., by not clearing the cache). The user will be notified again if the cache condition is still in effect when the process 200 is re-executed. In some embodiments the process 200 is executed when a threshold level of cache activity is detected. In some embodiments, the process 200 is executed at randomly selected times during a user session. In some embodiments, the process 200 is executed after a predefined amount of time has elapsed after a session begins. In some embodiments, the process 200 executes after a predefined number of user sessions. One of ordinary skill in the art will recognize other times to execute process 200 and remain within the scope of the invention.

Figure 3:
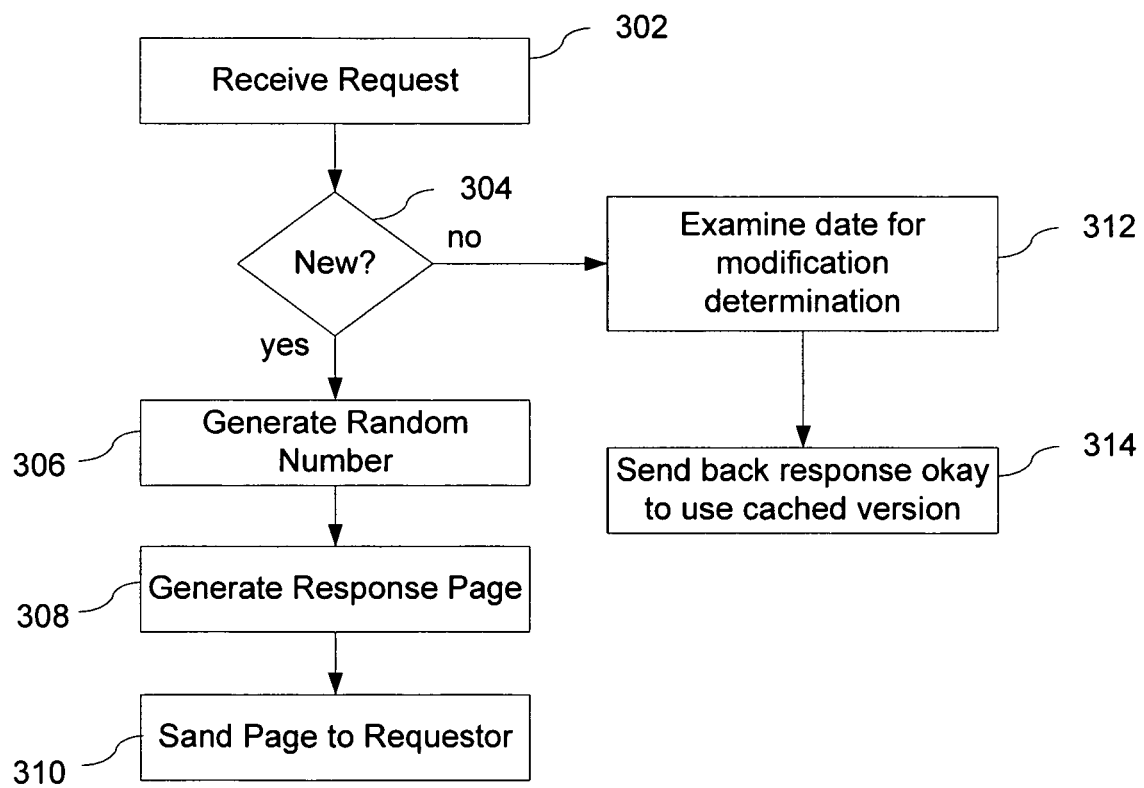
FIG. 3 depicts a process for responding to certain requests in accordance with some embodiments of the present invention.

FIG. 3 depicts an exemplary process 300 in a server 102 for responding to requests according to some embodiments of the invention. A document request from a browser (e.g., browser 108 of a client 104) is received at the server (302). If the request is new (304-yes) then a random or pseudo-number is generated using any number of well-known techniques (306). A request is considered new if it does not provide information indicating a previous version of the document (e.g., it does not contain an "If-Modified-Since" field). A response document, which includes the randomly or pseudo-randomly generated number, is generated (308) and is transmitted to the client (310). In some embodiments, the response includes a "Last-Modified" field indicating the date/time that the document was last modified. In some embodiments, the response includes a "Cache-Control" header field set to "private, proxy-revalidate". A setting of "private" implies that the response should not be cached in a cache accessible by more than one user and a setting of "proxy-revalidate" implies that the cached response need not be-revalidated unless the response is being cached in a proxy cache.

If the request is not new (304-no) (e.g., if the request contains an "If-Modified-Since" field), then the date/time in the request is compared against the last date/time of the document modification. In some embodiments, this comparison never results in a determination that the document has changed. As mentioned above, in some embodiments, the responses and requests are designed to result is use of a cached version, if any exists. In some embodiments, if the server detects a "If-Modified-Since" field, it returns a response indicating that the document has not changed. Accordingly, a response is sent back to the client instructing the browser 108 of the requesting client 104 to use the cached version of the document (e.g., using status code 304 (Not Modified)).

Figure 4:
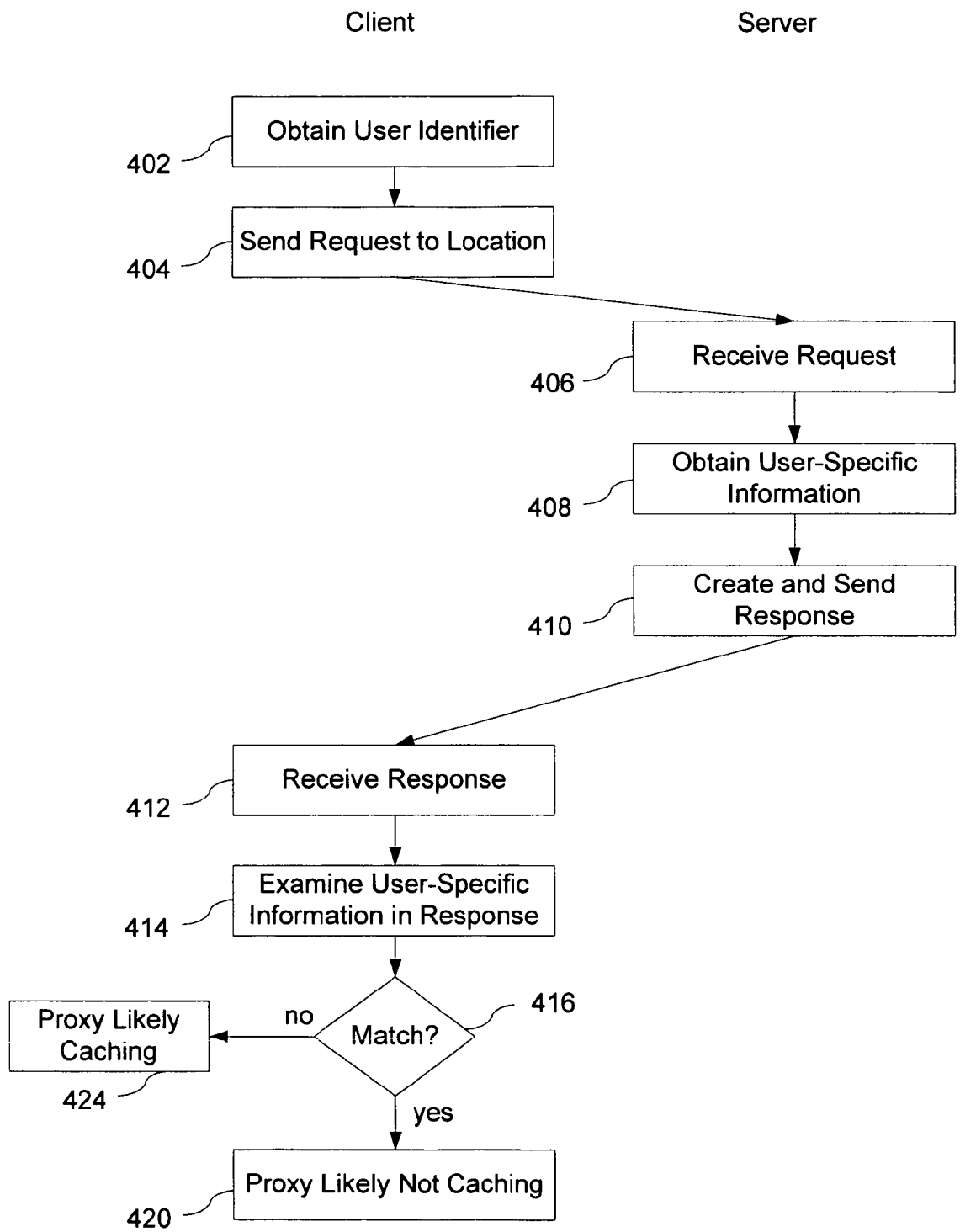
FIG. 4 depicts a process for detecting proxy caching in accordance with some embodiments of the present invention.

In some embodiments, the invention may provide an indication that a proxy cache between the browser 108 and the server 102 is likely caching information contrary to settings in a response generated by the server 102. FIG. 4 depicts an exemplary process 400 that determines a likelihood that a proxy is caching a document, contrary to one or more settings in a response, according to some embodiments of the invention. On a client 104, a user identifier associated with a user is obtained (402). In some embodiments, this is a cookie value used to communicate with and/or store state information for a web-based application residing on server 102. It is sufficient that the user identifier be used by the server to identify user-specific information about the user. A request for information is sent to a generic URL at a server (e.g., server 102) (404). In this context, a generic URL is a URL that is not specific to a particular user. A generic URL is more useful than a user specific URL for testing proxy caching. A document associated with a generic URL is more likely to be cached and subsequently retrieved from a proxy's cache if multiple users send requests to the same URL and the proxy is caching.

The request is received by the server 102 (406). The user identifier is identified from the request and used to obtain user-specific information (408). It is sufficient that the user-specific information be information associated with the user identifier provided by the request, and that the client assistant 110 also knows or can determine the same user identifier. The server 102 creates and sends a response which includes the user-specific information (410). In some embodiments, the response includes header information indicating that the response should not be cached (e.g., the "Cache-Control" field is set to "no-cache"). The response is received (412) at the client 104 and the user-specific information identified from the response (414) is compared with user-specific information known by the client assistant 110 to be associated with the user identifier included in the request. If the user-specific information is different, then the proxy obtained a cached version of the response (based on the generic URL) intended for a different user (and accordingly, including a different user's user-specific information). In this instance it is very likely that the proxy is caching (424) documents contrary to the intentions of the response provided by the server 102 (i.e., the incorrect response provided to the client by the proxy contained instructions not to cache the response when it was sent by server 102 in a previous response to the different user). On the other hand, if the values were the same (416-yes) the likelihood of caching is less certain. The result (416-yes) could indicate: 1) that only the client had made the request and the proper response was returned with no caching; or 2) that the client had made a previous request whose response the proxy had cached and no intervening requests/responses from other users were received at the proxy. As the number of users associated with the proxy increases (and therefore the probability that other client assistants 110 are also executing a process 400), the likelihood that the proxy is not caching when the values are the same (416-yes) likewise increases. In some embodiments, a value unique to the request can be inserted in the request sent to the server. The server extracts this value and inserts it into the response to negate condition (2) above when a previous request/response resulted in a cache. In some embodiments the client aspects or portions of process 400 are preformed by client assistant 110, while in other embodiments the client aspects or portions of process 400 are not executed by the client assistant 110.

It is noted that systems and computer program products that implement the browser cache testing process 200 (FIG. 2) need not implement the proxy cache testing process 400 (FIG. 4), and vice versa.

Figure 5:
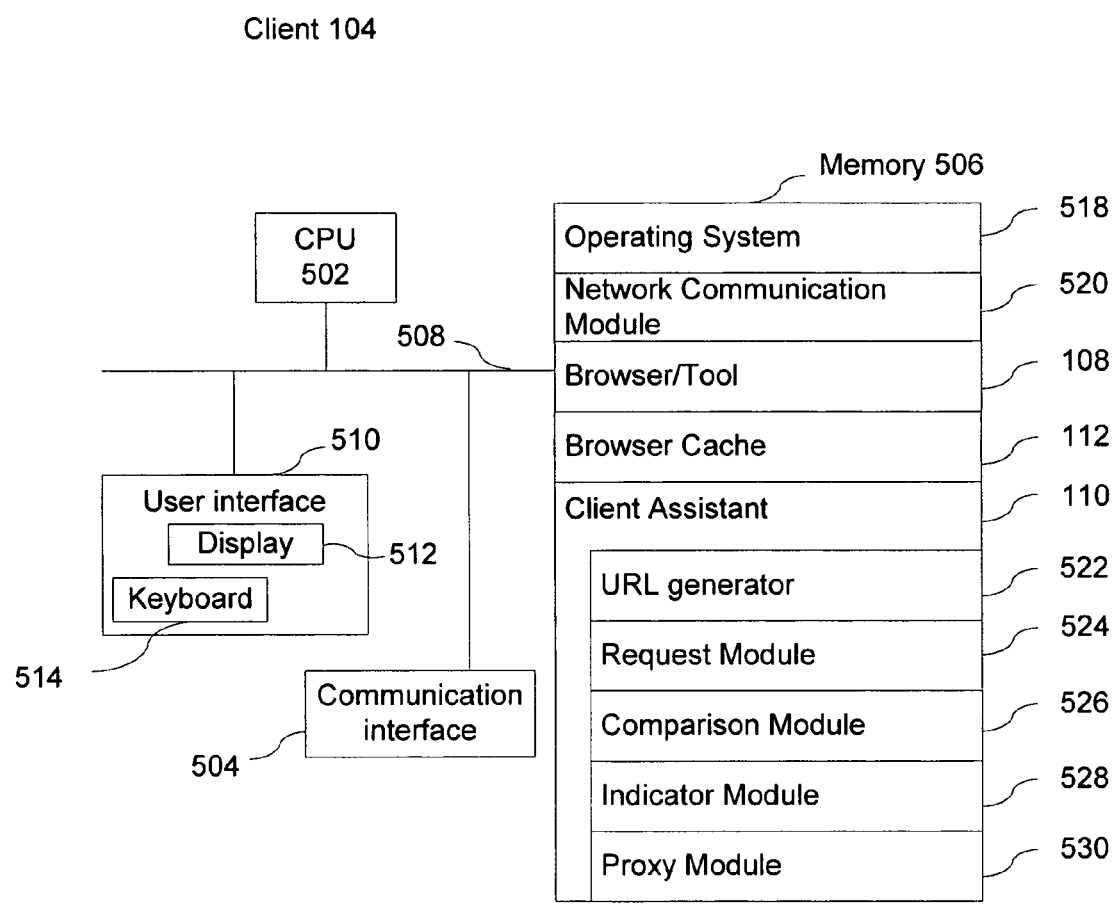
FIG. 5 depicts a client system in accordance with some embodiments of the present invention.

Referring to FIG. 5, an exemplary client 104 according to some embodiments, typically includes one or more processing units (CPU's) 502, one or more network or other communications interfaces 504, memory 506, and one or more communication buses 508 for interconnecting these components. The client 104 may include a user interface 510, for instance a display 512 and a keyboard 514. Memory 506 may include high speed random access memory and may also include non-volatile memory, such as one or more magnetic or optical storage disks. Memory 4506 may include mass storage that is remotely located from CPU's 502. Memory 506 may store the following elements, or a subset or superset of such elements:

- an operating system 518 that includes procedures for handling various basic system services and for performing hardware dependent tasks;
- a network communication module (or instructions) 520 that is used for connecting the client 104 to other computers via the one or more communications interfaces 504 and one or more communication networks, such as the Internet, other wide area networks, local area networks, metropolitan area networks, and so on;
- a browser/tool 108 for interfacing with a user, requesting and receiving documents from network locations as described above;
- a browser cache 112 for storing downloaded document as described above; and
- a client assistant 110 as described above, including a location generator 522 for identifying or generating a location (e.g., URL); a request module (or instructions) 524 for requesting and re-requesting documents as described above; a comparison module (or instructions) 526 for comparing the values in the responses; an indicator module (or instructions) 528 for indicating to the user the cache condition; and, optionally, a proxy module (or instructions) 530 for testing proxy caching as described above.

In some embodiments, the client assistant 110 is separate from the browser/tool 108, while in other embodiments the client assistant 110 is incorporated in the browser/tool 108.

Figure 6:
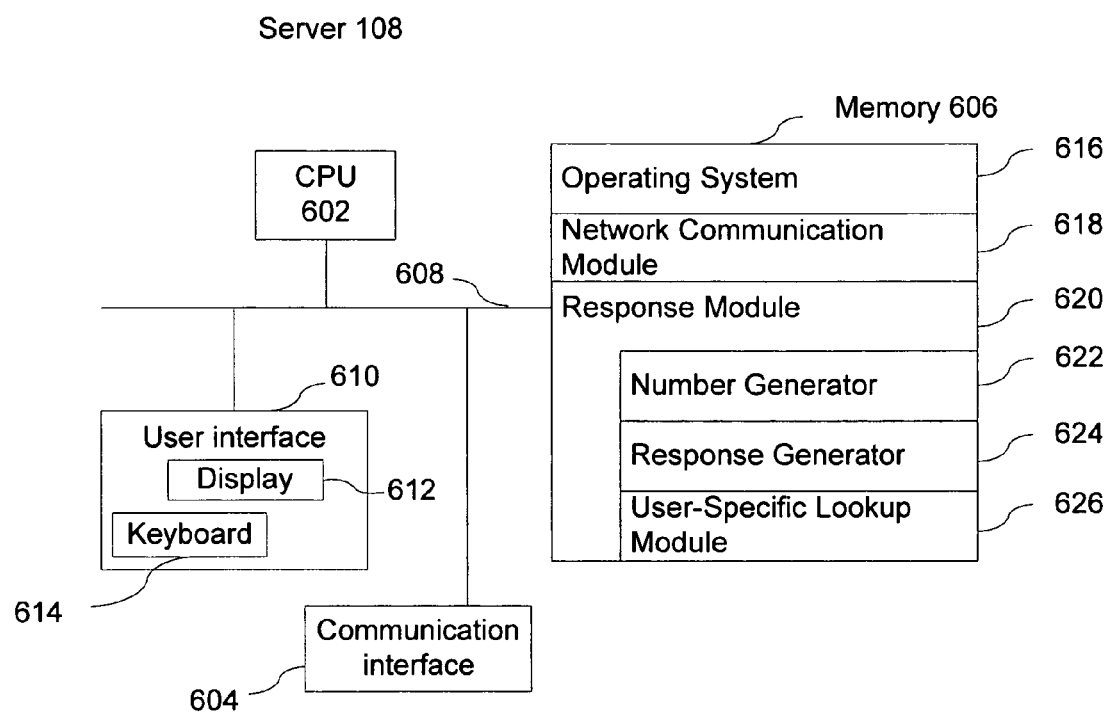
FIG. 6 depicts a server system in accordance with some embodiments of the present invention.

Referring to FIG. 6, an exemplary server 108 according to some embodiments typically includes one or more processing units (CPU's) 602, one or more network or other communications interfaces 604, memory 606, and one or more communication buses 608 for interconnecting these components. The server 108 may optionally include a user interface 610, for instance a display 612 and a keyboard 614. Memory 606 may include high speed random access memory and may also include non-volatile memory, such as one or more magnetic or optical storage disks. Memory 606 may include mass storage that is remotely located from CPU's 602. Memory 606 may store the following elements, or a subset or superset of such elements:

- an operating system 616 that includes procedures for handling various basic system services and for performing hardware dependent tasks;
- a network communication module (or instructions) 618 that is used for connecting the server 102 to other computers via the one or more communications interfaces 604 and one or more communication networks, such as the Internet, other wide area networks, local area networks, metropolitan area networks, and so on; and
- a response module or (instructions) 620 for receiving requests from clients 104 and responding as described above; in some embodiments the response module 620 includes a number generator 622 for generating random or pseudo-random numbers or values; in some embodiments the response module 620 includes a response generator 624 for generating and sending responses to requests as described above; and in some embodiments the response module 620 includes a user-specific lookup module (or instructions) 626 for looking up user-specific information using a user identifier.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of detecting a cache condition, comprising: at a client:
   requesting a document from a location;
   receiving a first response from the location, the first response including a first value;
   re-requesting the document from the location;
   receiving a second response, the second response including a second value; and
   indicating the cache condition to a user when the first value and the second value differ;
   wherein the first value and second value differ when the second response is not received from a cache of the client.

2. The method of claim 1, wherein the cache condition is a cache full condition.

3. The method of claim 1, wherein the cache condition is a browser cache condition.

4. The method of claim 1, wherein the method is performed by executable code downloaded from a server.

5. The method of claim 1, wherein the first value is a randomly or pseudo-randomly generated number created at a server.

6. The method of claim 1, wherein the location is based, at least in part, on a randomly or pseudo-randomly generated value.

7. The method of claim 1, wherein the location is a URL that includes a randomly or pseudo-randomly generated parameter value.

8. The method of claim 1, wherein the response further includes information indicating that a cached document is current.

9. The method of claim 1, wherein the indicating includes providing a link to a knowledge base.

10. The method of claim 1, wherein the requesting is performed during a login phase.

11. The method of claim 1, wherein the requesting is done upon detection of an email message with an attachment.

12. A computer program product, for use with a client computer system, the computer program product comprising:
   instructions for requesting a document from a location;
   instructions for receiving a first response from the location, the first response including a first value;
   instructions for re-requesting the document from the location;
   instructions for receiving a second response, the second response including a second value; and
   instructions for indicating the cache condition to a user when the first value and the second value differ;
   wherein the first value and second value differ when the second response is not received from a cache of the client computer system.

13. The computer program product of claim 12, wherein the cache condition is a cache full condition.

14. The computer program product of claim 12, wherein the cache condition is a browser cache condition.

15. The computer program product of claim 12, wherein the computer program product is executable code downloaded from a server.

16. The computer program product of claim 12, wherein the first value is a randomly or pseudo-randomly generated number created at a server.

17. The computer program product of claim 12, wherein the location is a URL that includes a randomly or pseudo-randomly generated parameter value.

18. The computer program product of claim 12, wherein the response further includes information indicating that a cached document is current.

19. The computer program product of claim 12, further including instructions for indicating the cache condition to a user.

20. A client system for detecting a cache condition, comprising:
   a location generator for generating a request location;
   a request module for making two requests for a document from the request location, each request resulting in a respective response;
   a comparison module for comparing a respective value in each of a respective responses; and
   an indicator module for indicating the cache condition to a user when the respective values differ;
   wherein the first value and second value differ when the second response is not received from a cache of the client system.

21. The system of claim 20, wherein the cache condition is a cache full condition.

22. The system of claim 20, wherein the cache condition is a browser cache condition.

23. The system of claim 20, wherein the first value is a randomly or pseudo-randomly generated number created at a server.

24. A system of detecting a cache condition, comprising:
   means for requesting a document from a location;
   means for receiving a first response from the location, the first response including a first value;
   means for re-requesting the document from the location;
   means for receiving a second response, the second response including a second value; and
   means for indicating the cache condition to a user when the first value and the second value differ;
   wherein the first value and second value differ when the second response is not received from a cache.

* * * * *